United States Patent [19]

Fujita

[11] 4,276,917

[45] Jul. 7, 1981

[54] MOBILE APPARATUS FOR FLUID TRANSFER

[75] Inventor: George Fujita, Norwalk, Calif.

[73] Assignee: FMC Corporation, San Jose, Calif.

[21] Appl. No.: 85,090

[22] Filed: Oct. 15, 1979

Related U.S. Application Data

[63] Continuation of Ser. No. 938,997, Sep. 1, 1978, abandoned.

[30] Foreign Application Priority Data

Apr. 8, 1978 [GB] United Kingdom ............... 13846/78

[51] Int. Cl.³ .......................... B65B 3/04; F16L 27/00

[52] U.S. Cl. .................................... 141/387; 137/615; 285/184

[58] Field of Search ..................... 9/8 P; 114/230, 264; 137/615; 141/231, 279, 284, 387, 388; 212/245; 285/181, 184, 420, DIG. 21; 414/139, 744

[56] References Cited

U.S. PATENT DOCUMENTS 3,889,728 6/1975 Riche .................................. 141/387

4,109,688 8/1978 Jameson .............................. 141/387

FOREIGN PATENT DOCUMENTS 829802 3/1960 United Kingdom .

*Primary Examiner*—Frederick R. Schmidt

*Attorney, Agent, or Firm*—J. W. Edwards; W. W. Ritt, Jr.; R. B. Megley

[57] ABSTRACT

A mobile platform has a riser assembly mounted thereon. A loading arm assembly projects from an upper end of the riser assembly, and a jumper hose assembly projects from a lower end of the riser assembly. These assemblies can be interconnected between a marine tanker manifold and a storage facility conduit, to form a fluid transferring connection therebetween. The riser assembly has a pipe section supporting the loading arm assembly for horizontal rotation about a vertical axis. A parallel mechanism, within the riser assembly, supports the pipe section for swinging movement in a vertical plane. This parallel mechanism maintains the vertical orientation of pipe section. A drive system is provided for maximizing the total horizontal angle of rotation through which the pipe section can be rotated about the vertical axis. A power drive is provided for operating the parallel mechanism to raise and lower the pipe section.

16 Claims, 10 Drawing Figures

FIG_7
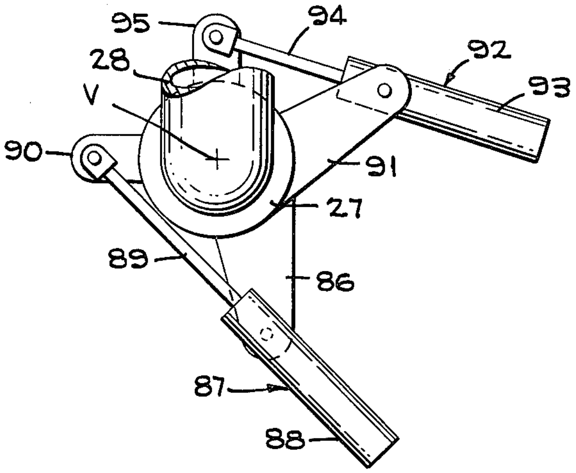
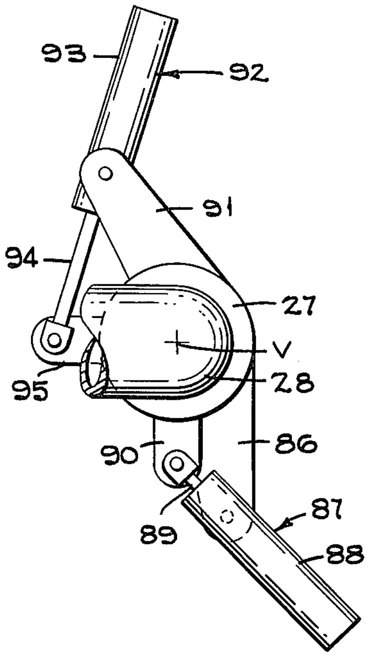
FIG_8
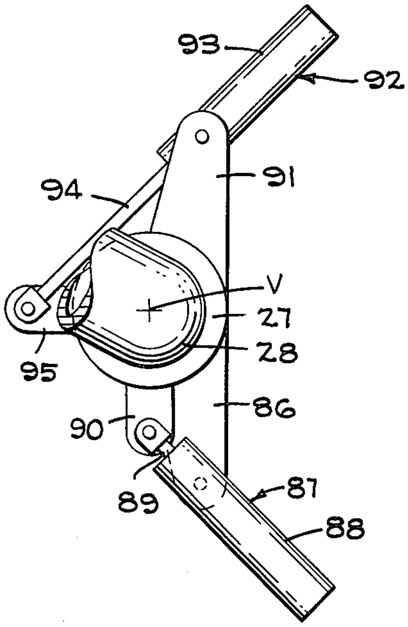
FIG_9
FIG_10
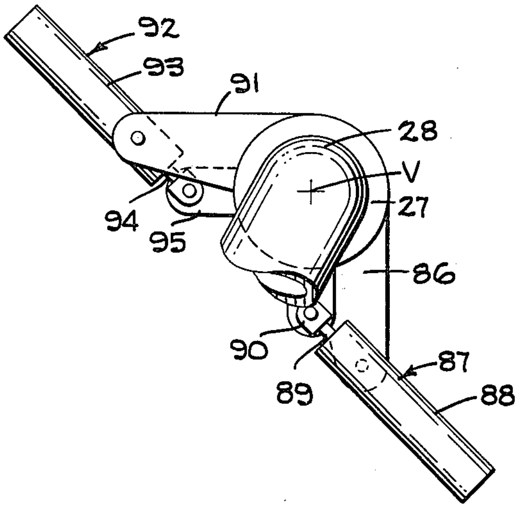

MOBILE APPARATUS FOR FLUID TRANSFER

This is a continuation of application Ser. No. 938,997, filed Sept. 1, 1978, now abandoned.

BACKGROUND OF THE INVENTION

1. Field of the Invention

This invention relates to apparatus for establishing a fluid transferring connection between a marine tanker manifold, adjacent to a dock, and a storage facility conduit on the dock. More specifically, the invention concerns a mobile carrier mounting for transporting, raising, lowering and slewing a loading arm assembly.

2. Description of the Prior Art

Fluid loading arms and jumper arms have been mounted on trailers for use on municipally owned docks, where privately owned equipment must be removed after completion of cargo loading or unloading operations. Equipment removal is necessary because of limited dock space. The dock space that is available must also be used for other than liquid cargo. Due to the height of such mobile loading arms, problems of stability and overhead clearance have been encountered. During strong wind conditions, or when traveling from one location to another, a loading arm with a high center of gravity can become dangerously unstable. Overhead obstructions, such as building structures and utility lines, can block the passage of a tall loading arm.

During travel, the loading arm assembly must be positioned to extend longitudinally of the trailer for side clearance purposes. Then to connect the loading arm assembly with a marine tanker manifold for fluid transfer, the assembly must be positioned to project laterally from the dock. Unless the trailer can be maneuvered to a position where its longitudinal axis extends transversely of the dock, the loading arm assembly must be rotated through a horizontal angle from a position extending longitudinally of both the trailer and the dock, to a position projecting laterally therefrom. A large, heavy loading arm assembly requires a horizontal rotation and slewing drive system, operable through a substantial, horizontal rotational angle.

U.S. Pat. No. 3,096,797, that issued to Bily on July 9, 1963, shows a fluid conducting boom assembly that is mounted on the upper end of a tiltable tower. This tower is mounted for pivotal movement about a horizontal axis adjacent its base. The base is mounted upon a turntable for horizontal rotation about a vertical standpipe. Rotation of the turntable is effected by means of a double-acting, hydraulic power cylinder. This cylinder is fixed to the turntable, and an operating rod, projecting from the cylinder is connected to the outer surface of the standpipe. The tower supports a series of conduit sections that extend between the standpipe and the boom assembly, and these conduit sections are interconnected by swivel joints.

SUMMARY OF THE INVENTION

In accordance with the present invention, there is provided an apparatus for establishing a fluid transferring connection between two conduits. This apparatus has a mobile platform that travels horizontally to a position adjacent one conduit. Mounted upon the mobile platform is a riser assembly that has an upper end and a lower end. A jumper hose assembly has a proximate end coupled to the lower end of the riser assembly and a distal end adapted to be coupled to the one conduit. A loading arm assembly has a proximate end mounted to the upper end of the riser assembly and a distal end adapted to be coupled to the other conduit. The riser assembly has a pipe section supporting the loading arm assembly for horizontal rotation about a vertical axis. This riser assembly has a mechanism supporting the rotatable pipe section for swinging movement in a vertical plane between lowered and elevated positions. This mechanism maintains the vertical orientation of the rotatable pipe section. Thus, the riser assembly can be raised to an upright position for fluid transferring operation, or the riser assembly can be lowered to a position for storage or traveling. In the lowered position, the height of the loading arm above the mobile platform is reduced, thereby lowering the center of gravity of the apparatus to improve stability. Such a reduction in overall height of the apparatus improves clearance between the apparatus and overhead obstructions. In a preferred embodiment of the invention, power operating means are provided for vertical swinging of the mechanism that supports the rotatable pipe section.

In a preferred embodiment of the invention, there is provided the sub-combination of a riser assembly having an upper end and a lower end, a loading arm assembly having a proximate end mounted to the upper end of the riser assembly and a distal end adapted to be coupled to one conduit, said lower end of the riser assembly being in flow communication with another conduit so that fluid can be transferred through the assemblies between conduits, said riser assembly having a rotatable pipe section supporting the loading arm assembly for horizontal rotation about a vertical axis and a non-rotatable pipe section that supports the rotatable pipe section coaxially thereabove, an intermediate ring coaxially mounted for horizontal rotation about the non-rotatable pipe section, a first power actuator connected between the non-rotatable pipe section and the intermediate ring, and a second power actuator connected between the rotatable pipe section and the intermediate ring, whereby said first power actuator rotates the intermediate ring and the upper pipe section through a horizontal angle of rotation and said second power actuator rotates the upper pipe section through an additional horizontal angle of rotation to maximize the total horizontal angle of rotation through which the rotatable pipe section can be rotated relative to the non-rotatable pipe section.

BRIEF DESCRIPTION OF THE DRAWING

FIGS. 7 through 10 are operational views of the horizontal rotation and slewing drive system shown in FIG. 6.

DESCRIPTION OF THE PREFERRED EMBODIMENT

Figure 1:
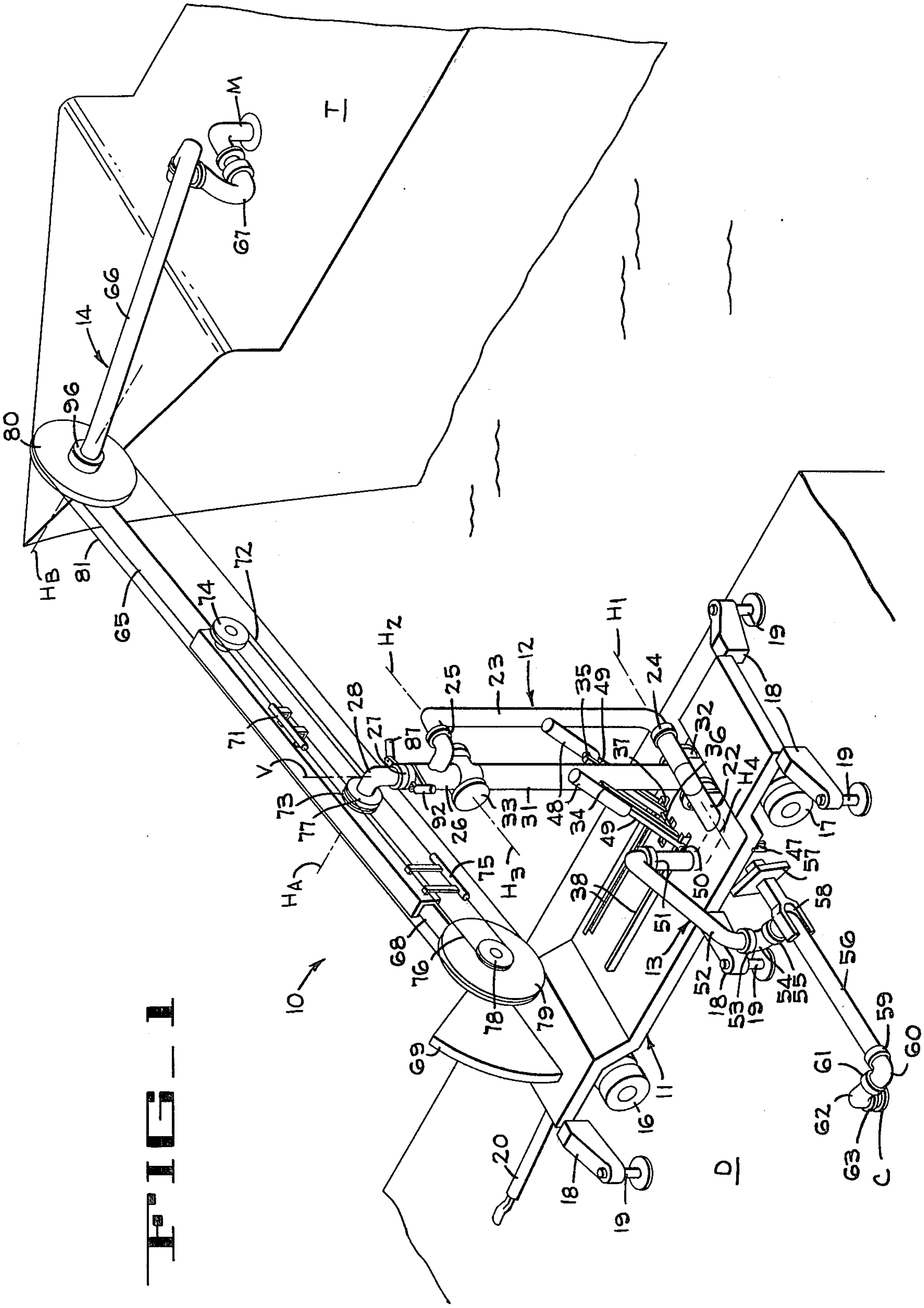
FIG. 1 is a perspective view of apparatus embodying the present invention in a position establishing a fluid transferring connection between a marine tanker manifold and a usual storage facility conduit.

Looking now at FIG. 1, an apparatus 10 establishes a fluid transferring connection between a manifold M on a marine tanker T and a usual storage facility conduit C on a dock D. The apparatus has a mobile platform 11 that is horizontally movable to a position adjacent to the conduit. Mounted upon the platform is a riser assembly 12 from which a jumper hose assembly 13 extends to couple with the storage facility conduit. A loading arm assembly 14 extends from the riser assembly to couple with the tanker manifold. The riser assembly is adapted for raising, lowering, and slewing the loading arm assembly.

The mobile platform 11 can be a small vessel that floats adjacent the dock D or a vehicle that travels upon the dock. Such a vehicle can be self-propelled, or preferably, the vehicle can be a trailer, as shown in FIG. 1. This trailer has sets of front wheels 16 and rear wheels 17 that support the platform. Further support is provided on each side of the platform by outriggers 18 and leveling jacks 19. These outriggers and leveling jacks are located at front, intermediate and rear portions of the platform. Cable or turnbuckle tie-downs, not shown, can connect the platform to the dock, if additional support is necessary during operation or storage of the loading arm assembly 14 under strong wind conditions. A tongue 20 is provided for pulling the mobile platform.

The riser assembly 12 has a stationary pipe 22 with a vertical portion that forms the lower end of the riser assembly. From that end portion, this stationary pipe makes a U-shaped bend, rearwardly through the mobile platform 11, and a lateral bend, to extend transversely of the platform. A fluid conducting link 23 is connected to the transversely extending portion of the stationary pipe by a swivel joint 24. This swivel joint enables the link to pivot in a vertical plane about the horizontal axis $H_1$. The opposite end of the fluid conducting link is connected by swivel joint 25 to a projecting elbow portion of a pipe section 26 for pivotal movement in a vertical plane about a horizontal axis $H_2$. The pipe section 26 is non-rotatable in a horizontal plane about a vertical axis V. This pipe section has an upper end connected by a swivel joint 27 to a rotatable pipe section 28 that swivels horizontally about the vertical axis V. The rotatable pipe section is a 90° elbow that has a horizontally extending upper end attached to the loading arm assembly 14 by a swivel joint, not shown, that enables rotation of the loading arm assembly in a vertical plane about a horizontal axis $H_4$.

The riser assembly 12 has a support link 31 that can be a pipe, beam or truss. One end of this link is pivotally attached by a hinge 32 to the mobile platform 11. The other end of the link is connected by a hinge 33 to the non-rotatable pipe section 26. The hinge 33 has a horizontal axis $H_3$ and the hinge 32 has a horizontal axis $H_4$. These horizontal axes extend transversely of the mobile platform 11. These hinges enable the support link to pivot in a vertical plane about the horizontal axes. The support link has a length between the horizontal axes $H_3$ and $H_4$ that corresponds to the length of the fluid conducting link 23 between the horizontal axes $H_1$ and $H_2$. The distance between the horizontal axes $H_1$ and $H_4$ corresponds to the distance between the horizontal axes $H_2$ and $H_3$. Thus, the fluid conducting link and the support link are always parallel. These links maintain the non-rotatable pipe section 26 in a vertical orientation supporting the rotatable pipe section 28. Since the loading arm assembly 14 is mounted to the rotatable pipe section at a location eccentric to the vertical axis V, any tilting of the non-rotatable pipe section would cause the loading arm assembly to swing the rotatable pipe section about the vertical axis V until reaching a low point.

The riser assembly 12 is supported in an upright position by a trailing link 34. This link has a pair of arms that are pivotally attached at one end to trunnions 35 projecting from the support link 31. At the opposite end of the trailing link arms, an axle 36 extends transversely through the arms. Rollers 37 are mounted on the outwardly projecting ends of the axle. These rollers travel within channel guideways 38 that are mounted on the mobile platform 11. The trailing link is locked mechanically when the riser assembly is in an upright position.

Figure 2:
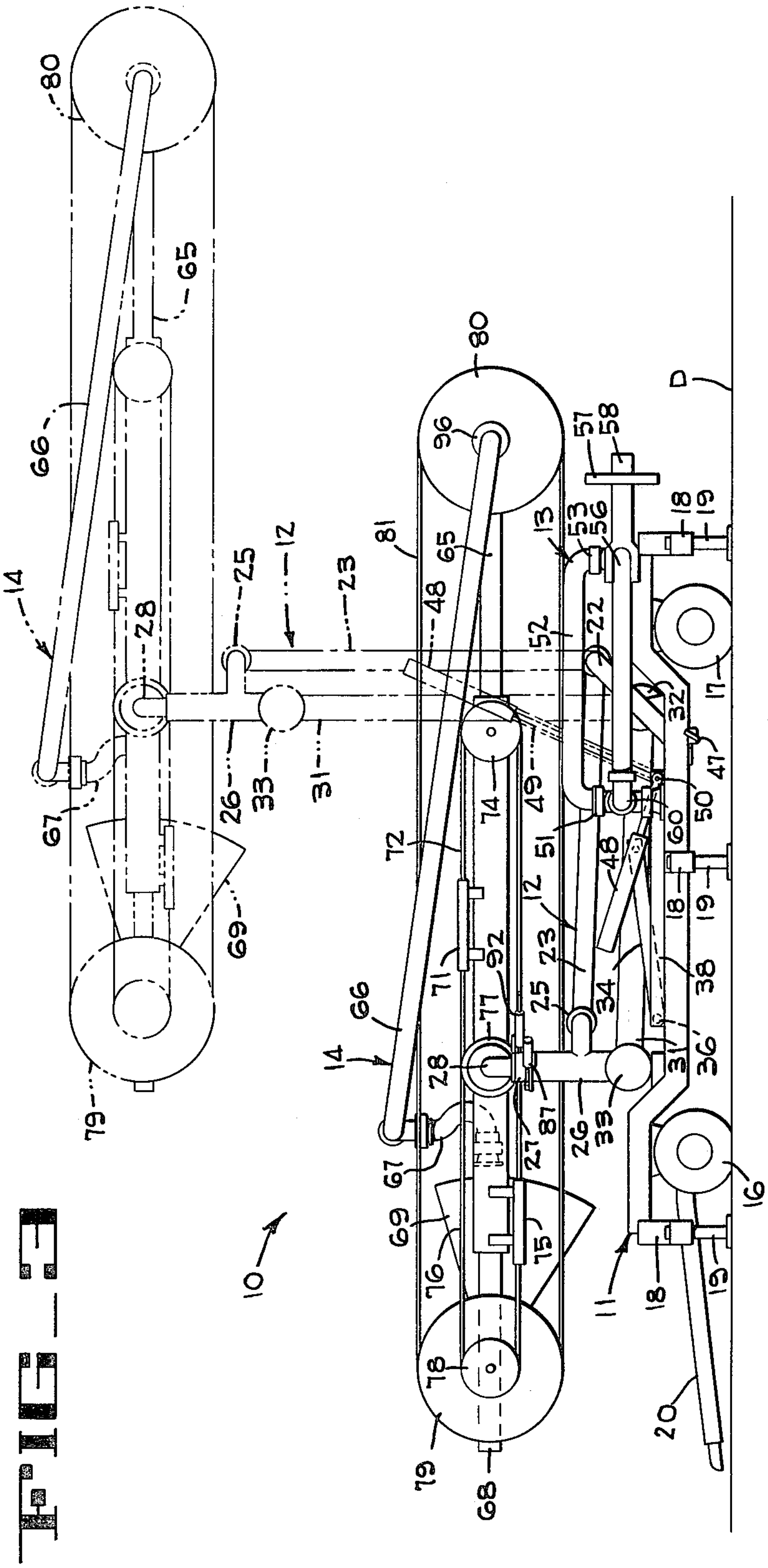
FIG. 2 is a side elevation view of the apparatus shown in FIG. 1 with the stowed position of the loading arm and riser assemblies being indicated in solid line and the elevated position of these assemblies being indicated in phantom line.
Figure 3:
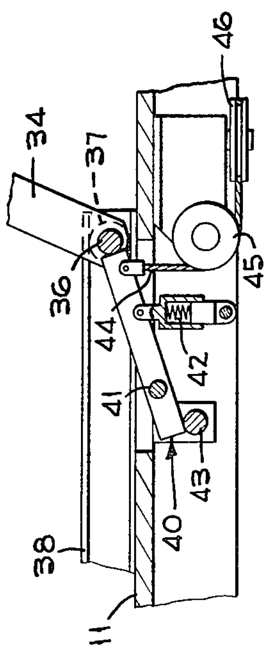
FIG. 3 is a detail view of a spring loaded latch that locks the trailing link of the riser assembly in a position for holding the riser assembly upright.

With reference to FIG. 3, a spring loaded latch 40 engages the axle 36 when the riser assembly 12 is in an upright position. This latch is pivotally mounted on a pin 41. Between the mobile platform 11 and the latch is a compression spring assembly 42 that resiliently urges the latch upward to a locking position, as shown. A stop 43 limits the upward movement of the latch. When the axle 36 moves longitudinally of the guideways 38, toward the locked position, the axle will depress the latch and compress the compression spring assembly. After the axle passes over the latch, the compression spring assembly will elevate the latch to lock the axle in place. A pull cable 44 is attached at one end to the latch. This cable bends about a pulley 45 and a pulley 46. At the opposite end of the cable is a handle 47, mounted at the side of the mobile platform, as shown in FIG. 2. Thus, the latch can be released by pulling the handle of the cable.

The riser assembly 12 is elevated by a pair of double acting hydraulic cylinders 48. These cylinders are connected to the trunnions 35 that project on each side of the support link 31. The cylinders are located outwardly from the arms of the trailing line 34. The cylinders have rods 49 extending therefrom to outermost ends that are attached to the mobile platform 11 at fixed pivot points 50. The cylinders are operated by a conventional hydraulic circuit, not shown. Preferably, this circuit includes a pilot operated, four-way control valve. Flow of fluid within the circuit is blocked when the self centering control valve is in a neutral position. This blockage of flow, coupled with fluid trapped in the piston side of the hydraulic cylinder, acts as a hydraulic lock for the hydraulic cylinders and the riser assembly. The spring loaded latch 40 is an auxiliary mechanical lock that holds the trailing link in position to maintain the riser assembly upright in the event of loss of fluid pressure as might occur due to fluid seepage from the hydraulic lock.

The jumper hose assembly 13 has a proximate end that is connected by a vertical axis swivel 51 to a lower end of the riser assembly 12. An inboard arm 52 projects from the swivel 51 to a vertical axis swivel 53 that has a 90° elbow 54 attached thereto. A horizontal axis swivel 55 attaches the opposite end of the elbow to an outboard arm 56. A counterweight 57 is attached by a counterweight beam 58 to the outboard arm adjacent the swivel 55 for counterbalancing the outboard arm.

At the distal end of the outboard arm is a swivel joint 59 that attaches to a 90° elbow 60. This elbow is connected by a swivel joint 61 to a 90° elbow 62 that has a coupling flange 63 for attachment to the storing facility conduit C. The elbows 60,62, the swivel joints 59,61, and the coupling flange 63 form a universal coupling assembly. Thus, the jumper hose assembly can be extended from the riser assembly to couple with the conduit.

The loading arm assembly 14 has an inboard arm 65 with a proximate end that is connected to an upper end of the riser assembly 12 for swiveling about the horizontal axis $H_A$. The inboard arm has a distal end that is connected to the proximate end of an outboard arm 66 for pivoting through swivel joint 96 about a horizontal axis $H_B$. The distal end of the outboard arm is pivotally connected to a universal coupling assembly 67, formed by two elbows, two swivel joints and a coupling flange that couples with the flange from marine tanker manifold M. The loading arm assembly is counterbalanced by a beam 68 that extends rearwardly from the proximate end of the inboard arm, and by a counterweight 69 that is mounted for rotation at the opposite end of the beam.

The inboard arm 65 is driven for rotation about the horizontal axis $H_A$ by a drive cylinder 71. This cylinder has a double ended rod attached at each end to a cable 72. The cable is trained about a non-rotatable pulley 73 that is fixed to the elbow 28 and an idler pulley 74 that is attached to the inboard arm. The outboard arm is driven by a drive cylinder 75 having a cable 76 attached at each end. This cable is trained about an idler pulley 77 that is mounted for rotation about the elbow 28, and a drive pulley 78 that is mounted for rotation with a pulley 79 and the counterweight 69. A pulley 80 is fixed to rotate with the outboard arm 66, and a cable 81 is trained about the pulleys 79 and 80. Thus, rotation of the pulley 79 is transmitted through cable 81 to the pulley 80 for rotation of the outboard arm 66.

Figure 6:
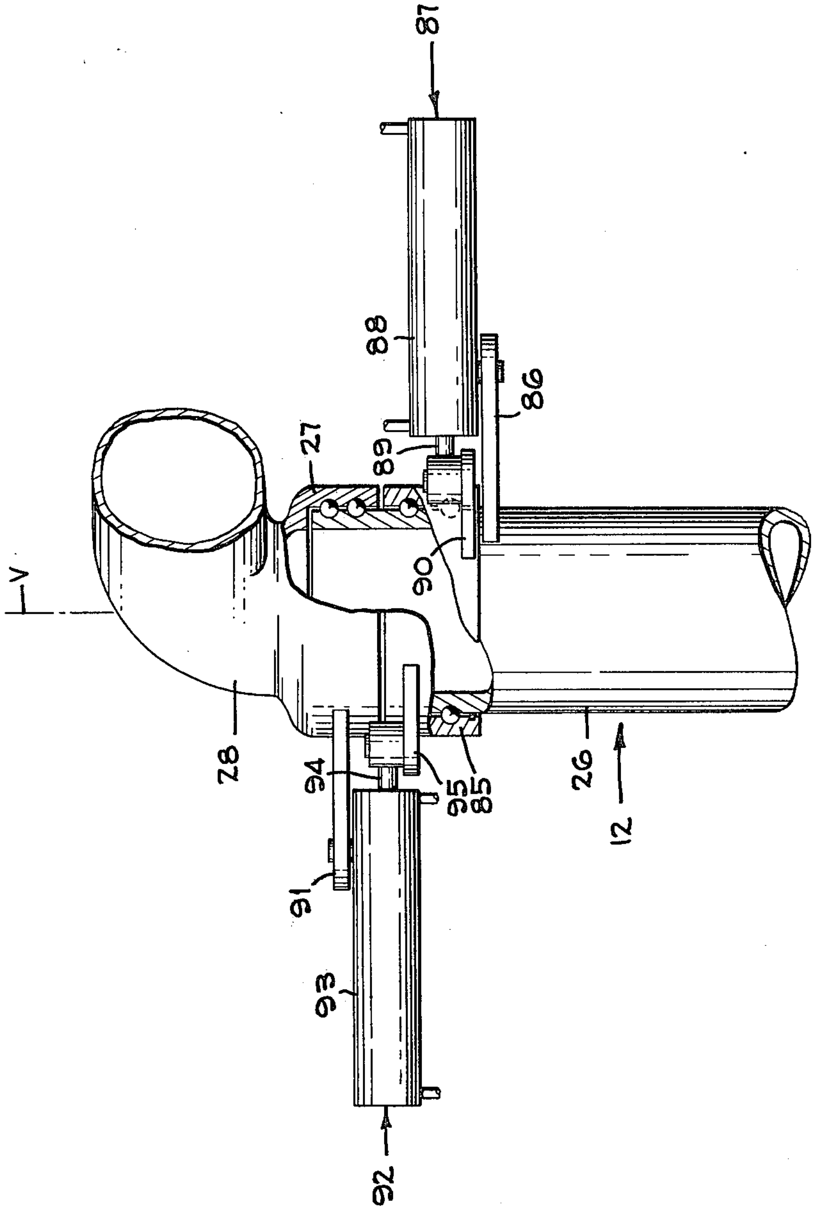
FIG. 6 is a detail view of a horizontal rotation and slewing drive system for the apparatus shown in FIG. 1.

With reference to FIG. 6, a horizontal rotation and slewing drive system is shown. The non-rotatable pipe section 26 is connected by the swivel joint 27 to the rotatable pipe section 28 that is in the form of a 90° elbow. The rotatable pipe section rotates horizontally about the vertical axis V of the non-rotatable pipe section. An intermediate ring 85 is coaxially mounted for horizontal rotation about the non-rotatable pipe section. A bracket 86 that projects from the non-rotatable pipe section supports a first power actuator 87. This actuator has a hydraulic cylinder 88 that is pivotally attached to the bracket and an actuating arm 89 that is pinned to an ear 90 projecting from the intermediate ring. A bracket 91 projects from the rotatable pipe section to support a second power actuator 92. This actuator has a hydraulic cylinder 93 that is pivotally connected to the bracket 91 and an actuating arm 94 that is pinned to an ear 95 projecting from the intermediate ring.

Looking now at FIGS. 7 through 10, the operation of the horizontal rotation and slewing drive system is illustrated. When the rotatable pipe section 28 is in the position shown in FIG. 7, the loading arm assembly 14 is aligned longitudinally of the movable platform 11. The first power actuator 87 is then actuated to retract the arm 89 into the cylinder 88, as shown in FIG. 8. The second power actuator locks the rotatable pipe section with the intermediate ring 85, and the ring and rotatable pipe section are rotated through a horizontal angle of rotation of about 90°. Thus, the loading arm assembly is positioned to project laterally from the mobile platform 11. Then, slewing of the loading arm assembly for coupling with the manifold M can be controlled by the second power actuator 92. This actuator can be actuated to extend the arm 94 from the cylinder 93, as shown in FIG. 9. The first power actuator locks the intermediate ring to the non-rotatable pipe section 26. Thus, the upper pipe section 28 rotates backwardly through an angle that can be about 45°. The second power actuator can then be operated to retract the arm 94 into the cylinder 93, as shown in FIG. 10, thereby rotating the upper pipe section through a 90° angle of horizontal rotation. While each power actuator can provide for a 90° angle of horizontal rotation, these angles overlap so that the maximum total rotation is about 135°. However, the first power actuator is used for rotating the loading arm assembly from a traveling position to an operating position. Then the second power actuator controls slewing of the assembly for coupling with the marine tanker manifold M.

In operation of the apparatus 10, the mobile platform 11 is towed on the dock D to a location adjacent the conduit C, as shown in FIG. 1. The loading arm assembly 14 is in the lowered position, shown in solid line in FIG. 2. The leveling jacks 19 are set to provide support for the mobile platform. The hydraulic cylinders 48 are actuated to elevate the riser assembly 12 and the loading arm assembly to the upper position, shown in phantom line in FIG. 2. In this position, the spring loaded latch 40 engages the axle 36, as shown in FIG. 3, to mechanically lock the trailing link 34 in position to maintain the riser assembly 12 upright.

Figure 4:
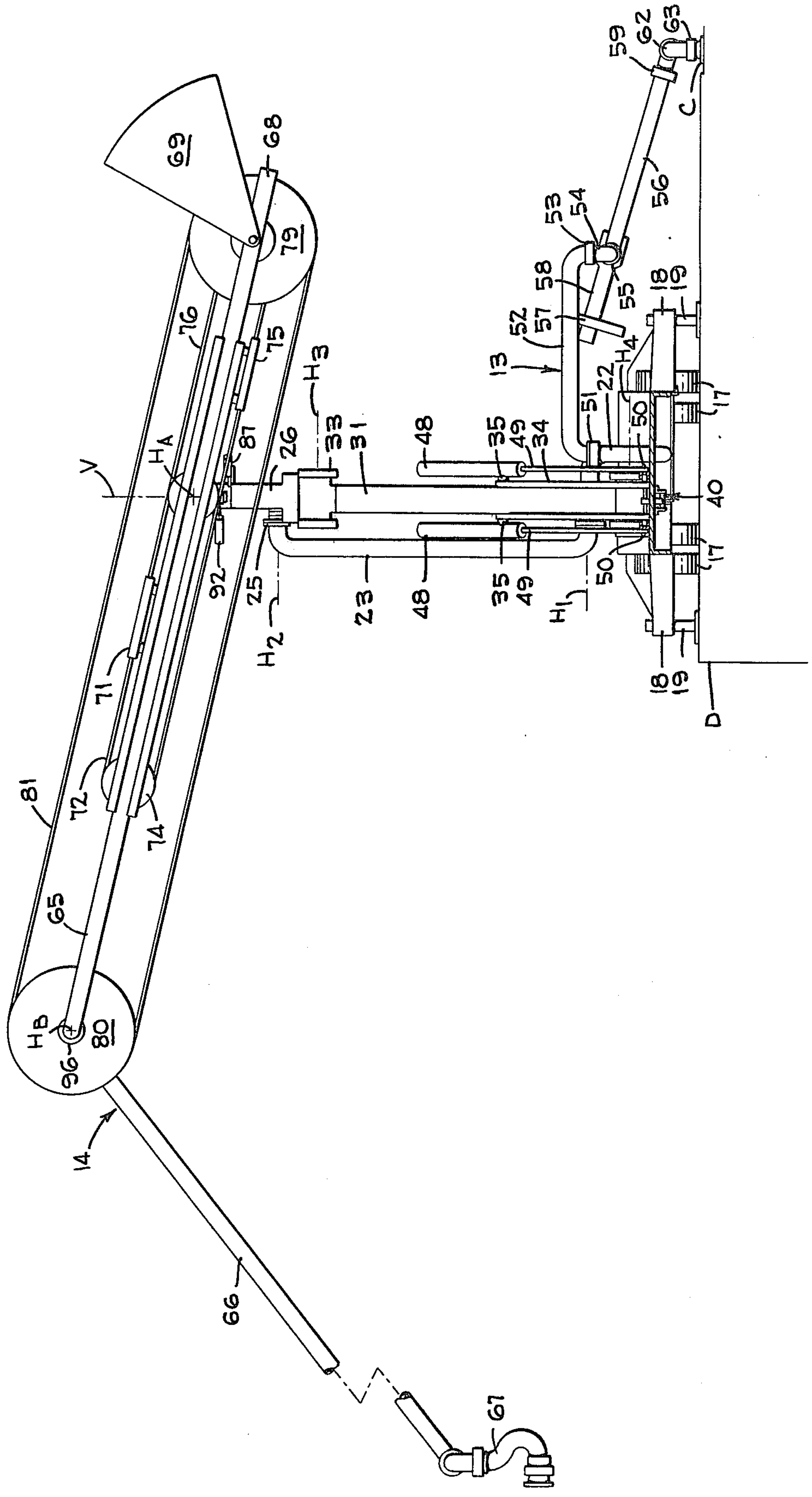
FIG. 4 is a transverse section of the apparatus shown in FIG. 1.
Figure 5:
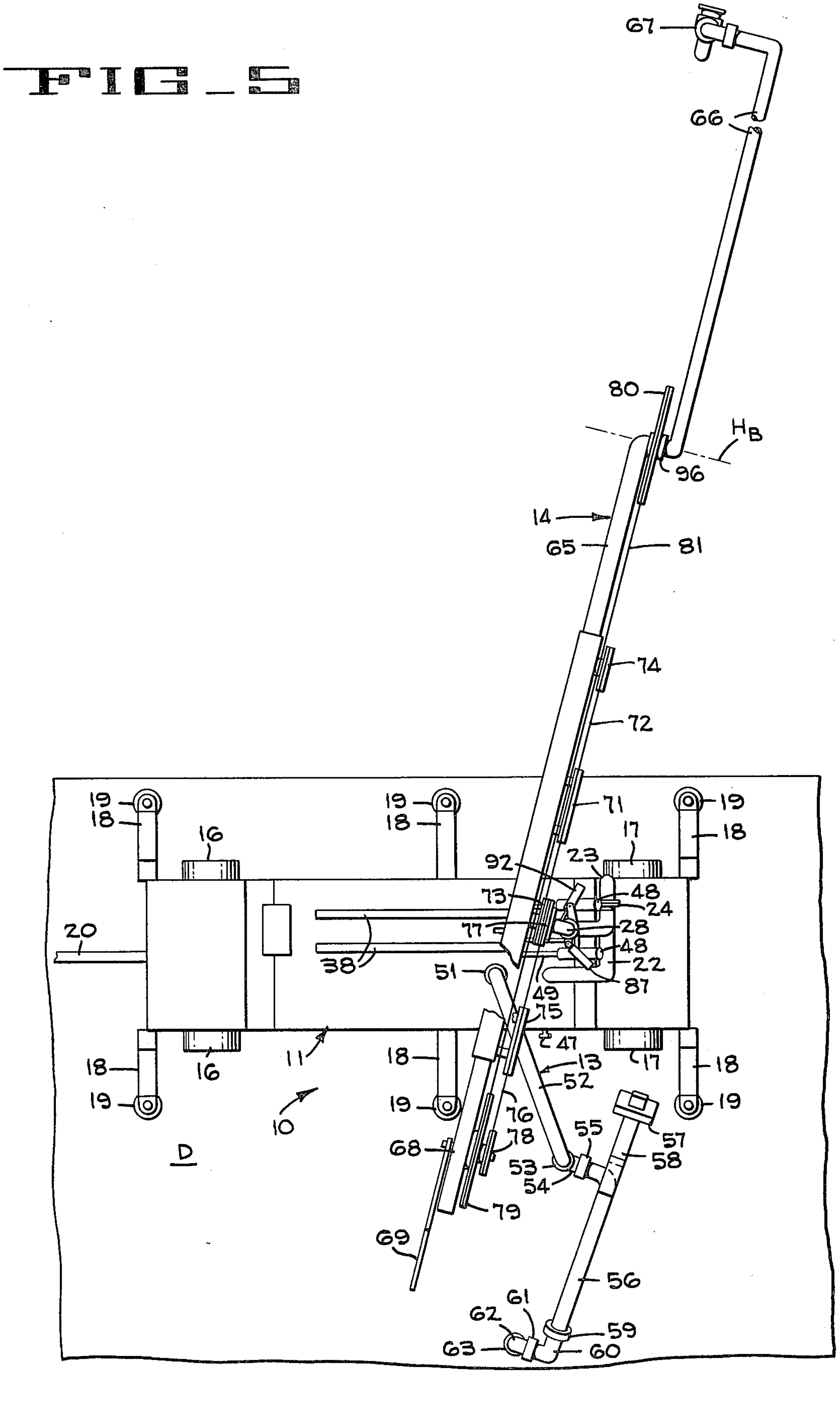
FIG. 5 is a top plan view of the apparatus shown in FIG. 1.

The first power actuator 87 is then operated to rotate the loading arm assembly 14, through a horizontal rotational angle of 90°, to project laterally from the mobile platform 11, as shown in FIGS. 1 and 4. The second power actuator 92 can be operated for slewing the loading arm assembly 14, as shown in FIG. 5, for connection with a marine tanker manifold M. The inboard arm 65 is raised and lowered by the drive cylinder 71, and the outboard arm 66 is similarly controlled by the drive cylinder 75. The loading arm assembly is coupled to the marine tanker manifold, and the jumper hose assembly 13 is coupled to the conduit C for transferring fluid therebetween.

After fluid transfer has been completed, the jumper hose assembly 13 and the loading arm assembly 14 are retracted to the mobile platform 11. The handle 47 is pulled to release the spring loaded latch 40 and the trailing link 34. The riser assembly 12 and the loading arm assembly 14 are lowered to the position for traveling and stowing. The leveling jacks 19 are retracted, and the mobile platform 11 is towed to another location for similar operation or storage.

In view of the foregoing description, it will be seen that the fluid transferring apparatus 10 has a riser assembly 12 that can be raised or lowered for supporting a loading arm assembly 14. In the lowered position, that is used for traveling or storage, the height of the loading arm assembly above a mobile platform 11 is reduced. Thus, the center of gravity is lowered to improve stability of the apparatus. Such a reduction in height improves clearances during travel between the apparatus and overhead obstructions. A horizontal rotation and slewing drive system is provided for maximizing the total horizontal angle of rotation that a rotatable section 28 of the riser assembly can be rotated through about a vertical axis V.

Although the best mode contemplated for carrying out the present invention has been herein shown and described, it will be apparent that modification and variation may be made without departing from what is regarded to be the subject matter of the invention.

What is claimed is:

1. An apparatus for establishing a fluid transferring connection between two conduits, said apparatus comprising a mobile platform that travels horizontally to a position adjacent one conduit, a riser assembly mounted upon the mobile platform, said riser assembly having an upper end and a lower end, a jumper hose assembly having a proximate end coupled to the lower end of the riser assembly and a distal end adapted to be coupled to the one conduit, and a loading arm assembly having a proximate end mounted to the upper end of the riser assembly and a distal end adapted to be coupled to the other conduit, said riser assembly having a rotatable pipe section supporting the loading arm assembly for horizontal rotation about a vertical axis, said riser assembly having a mechanism supporting the rotatable pipe section for swinging movement in a vertical plane between lowered and elevated positions, said mechanism including a parallel linkage having a non-rotatable pipe section that supports the rotatable pipe section for rotation about the vertical axis, a fluid conducting link pivotally connected between the non-rotatable pipe section and a lower portion of the riser assembly, and a support link pivotally connected between the non-rotatable pipe section and the mobile platform, said fluid conducting link and said support link having the same length between pivotal axes at the ends thereof, said pivotal axes extending horiztonally in a direction transversely of the mobile platform, said pivotal axes being laterally spaced by the same distance at the mobile platform and at the non-rotatable pipe section, said mechanism maintaining the vertical orientation of the rotatable pipe section, said riser assembly including a traveling link having an upper end pivotally connected to the support link and a lower end mounted for guided travel along the mobile platform, a guide means mounted on said mobile platform for guiding the lower end of said traveling link, and means for mechanically locking the traveling link in a position where the support link projects upright from the mobile platform, said traveling link providing lateral support for the upright support link.

2. The apparatus described in claim 1 wherein said loading arm assembly is mounted to the rotatable pipe section at a location eccentric of the vertical axis about which the pipe section and the loading arm assembly rotate horizontally.

3. The apparatus described in claim 1 including power operating means interconnected between the support link and the mobile platform for raising and lowering the support link.

4. An apparatus for establishing a fluid transferring connection between two conduits, said apparatus comprising a mobile platform that travels horizontally to a position adjacent one conduit, a riser assembly mounted upon the mobile platform, said riser assembly having an upper end and a lower end, a jumper jose assembly having a proximate end coupled to the lower end of the riser assembly and a distal end adapted to be coupled to the one conduit, and a loading arm assembly having a proximate end mounted to the upper end of the riser assembly and a distal end adapted to be coupled to the other conduit, said riser assembly having a rotatable pipe section supporting the loading arm assembly for horizontal rotation about a vertical axis, said riser assembly having a mechanism supporting the rotatable pipe section for swinging movement in a vertical plane between lowered and elevated positions, said mechanism maintaining the vertical orientation of the rotatable pipe section including a non-rotatable pipe section that supports the rotatable pipe section for horizontal rotation about the vertical axis, an intermediate ring coaxially mounted for rotation about the non-rotatable pipe section, a first power actuator connected between the non-rotatable pipe section and the intermediate ring, and a second power actuator connected between the rotatable pipe section and the intermediate ring, whereby said first power actuator rotates the intermediate ring and the upper pipe section through a horizontal angle of rotation and said second power actuator rotates the upper pipe section through an additional horizontal angle of rotation to maximize the total horizontal angle of rotation that the rotatable pipe section can be rotated through relative to the non-rotatable pipe section.

5. In a apparatus for establishing a fluid transferring connection between two conduits, a riser assembly having an upper end and a lower end, a loading arm assembly having a proximate end mounted to the upper end of the riser assembly and a distal end adapted to be coupled to one conduit, said lower end of the riser assembly being in flow communication with the other conduit so that fluid can be transferred from one conduit through the assemblies to the other conduit, said riser assembly having a rotatable pipe section supporting the loading arm assembly for horizontal rotation about a vertical axis and a non-rotatable pipe section that supports the rotatable pipe section coaxially thereabove, an intermediate ring coaxially mounted for horizontal rotation about the non-rotatable pipe section, a first power actuator connected between the non-rotatable pipe section and the intermediate ring, and a second power actuator connected between the rotatable pipe section and the intermediate ring, whereby said first power actuator rotates the intermediate ring and the upper pipe section through a horizontal angle of rotation and said second power actuator rotates the upper pipe section through an additional horizontal angle of rotation to maximize the total horizontal angle of rotation through which the rotatable pipe section can be rotated relative to the non-rotatable pipe section.

6. A slewing system for pivotally moving a rotatable pipe about a length of fixed pipe, with said rotatable pipe movable through a relatively large slewing angle, said slewing system comprising:

first and second extendable power actuators;

a pipe swivel joint connected between said fixed pipe and said rotatable pipe;

an intermediate ring swivelly mounted about said fixed pipe;

means for connecting said first power actuator between said fixed pipe and said intermediate ring; and means for connecting said second power actuator between said rotatable pipe and said intermediate ring.

7. A slewing system for pivotally moving a rotatable pipe as defined in claim 6 wherein each of said power actuators includes a body portion and an extendable arm, said slewing system including means for connecting said body portion of said first power actuator to said fixed pipe, means for connecting said arm of said first power actuator to said intermediate ring, means for connecting said body portion of said second power actuator to said rotatable pipe and means for connecting said arm of said second power actuator to said intermediate ring.

8. A slewing system for pivotally moving a rotatable pipe as defined in claim 6 wherein said first and said second power actuators provide approximately 135° of rotation of said rotatable pipe relative to said fixed pipe.

9. A slewing system for pivotally moving a rotatable pipe as defined in claim 6 wherein extending said first power actuator causes said intermediate ring and said rotatable pipe to rotate through a first predetermined angle relative to said fixed pipe, and wherein extending said second power actuator causes said rotatable pipe to rotate through a second predetermined angle relative to said intermediate ring and said fixed pipe.

10. A slewing system for pivotally moving a marine loading arm about a length of fixed pipe, said loading arm being movable through a relatively large slewing angle, said slewing system comprising:

first and second extendable power actuators;

a pipe elbow having a swivel joint at one end thereof;

means for mounting said swivel joint on an end of said fixed pipe;

an intermediate ring having a pair of ears projecting radially outward from said ring;

means for swivelly mounting said ring about an end portion of said fixed pipe;

means for connecting said first power actuator between said fixed pipe and a first ear on said intermediate ring; and means for connecting said second power actuator between said pipe elbow and a second ear on said intermediate ring.

11. A slewing system for pivotally moving a marine loading arm as defined in claim 10 wherein an extension of said first power actuator causes said intermediate ring and said pipe elbow to rotate relative to said fixed pipe through a first predetermined angle, and an extension of said second power actuator causes said pipe elbow to rotate relative to said fixed pipe and to said intermediate ring through a second predetermined angle.

12. A slewing system for pivotally moving a marine loading arm about a fixed vertical riser, said loading arm being pivotally mounted atop said vertical riser for rotation about a vertical axis, said system having means for pivoting said loading arm through an angle of approximately 135 degrees, said slewing system comprising:

first and second hydraulic rams each having a body portion and an extendable rod;

an annular ring having a pair of ears projecting radially outward from said ring;

means for mounting said annular ring for pivotal movement about said vertical riser;

means for connecting said body portion of said first hydraulic ram to said vertical riser;

means for connecting said rod of said first hydraulic ram to one of said radial ears on said annular ring;

means for connecting said body portion of said second hydraulic ram to said loading arm; and means for connecting said rod of said second hydraulic ram to the other of said radial ears on said annular ring.

13. A slewing system as defined in claim 12 wherein said radial ears on said annular ring are spaced approximately 90 degrees apart.

14. A slewing system as defined in claim 12 wherein said loading arm includes an elbow connected to an inboard end of said loading arm and a swivel joint connected between said elbow and an upper end of said riser.

15. A slewing system as defined in claim 12 wherein said annular ring is mounted coaxially about said vertical riser for horizontal rotation about said vertical riser.

16. A slewing system as defined in claim 12 including means for pivotally connecting said body portion of said first hydraulic ram to said vertical riser and means for pinning said rod of said first hydraulic ram to one of said ears on said annular ring.

* * * * *